United States Patent [19]
Fujii

[11] Patent Number: 5,636,187
[45] Date of Patent: Jun. 3, 1997

[54] MAGNETOOPTICAL RECORDING APPARATUS AND MAGNETOOPTICAL RECORDING METHOD FOR CANCELING LEAKAGE MAGNETIC FIELDS ASSOCIATED WITH A RECORDING MEDIUM AND DEVICES ANCILLARY TO THE RECORDING MEDIUM

[75] Inventor: Eiichi Fujii, Yokohama, Japan

[73] Assignee: Canon Kabushiki Kaisha, Tokyo, Japan

[21] Appl. No.: 528,609

[22] Filed: Sep. 15, 1995

Related U.S. Application Data

[63] Continuation of Ser. No. 163,690, Dec. 9, 1993, abandoned.

[30] Foreign Application Priority Data

Dec. 11, 1992 [JP] Japan .................... 4-352458

[51] Int. Cl.⁶ .................................. G11B 11/00
[52] U.S. Cl. ............................. 369/13; 360/114
[58] Field of Search ................. 369/13, 44.11, 369/44.31, 44.21, 44.13, 110, 14; 360/59, 114; 365/122

[56] References Cited

U.S. PATENT DOCUMENTS

| | | | |
|---|---|---|---|
| 4,707,755 | 11/1987 | Ohta et al. | 360/114 |
| 4,862,437 | 8/1989 | Okada | 369/13 |
| 4,939,711 | 7/1990 | Yoda | 369/13 |
| 4,959,820 | 9/1990 | Horimai et al. | 369/13 |
| 5,093,816 | 3/1992 | Taniguchi et al. | 369/13 |
| 5,126,985 | 6/1992 | Ikegame et al. | 369/13 |
| 5,175,714 | 12/1992 | Kikitsu et al. | 369/13 |
| 5,412,627 | 5/1995 | Ichihara et al. | 369/13 |

FOREIGN PATENT DOCUMENTS

| | | |
|---|---|---|
| 19161 | 1/1991 | Japan . |
| 216836 | 9/1991 | Japan . |

*Primary Examiner*—Ali Neyzari
*Attorney, Agent, or Firm*—Fitzpatrick, Cella, Harper & Scinto

[57] ABSTRACT

In a magnetooptical recording apparatus, a magnetic field modulated in accordance with an input signal is applied to a portion of a recording medium onto which a light beam is irradiated. The magnetooptical recording apparatus includes a device for applying a magnetic field for canceling a self leakage magnetic field applied from a portion having a magnetization other than the light beam irradiated portion of the medium, and a leakage magnetic field leaking from a member other than the medium.

4 Claims, 5 Drawing Sheets

MAGNETOOPTICAL RECORDING APPARATUS AND MAGNETOOPTICAL RECORDING METHOD FOR CANCELING LEAKAGE MAGNETIC FIELDS ASSOCIATED WITH A RECORDING MEDIUM AND DEVICES ANCILLARY TO THE RECORDING MEDIUM

This application is a continuation of prior application, application Ser. No. 08/163,690 filed Dec. 9, 1993, now abandoned.

BACKGROUND OF THE INVENTION

1. Field of the Invention

The present invention relates to a magnetooptical recording apparatus for recording information by irradiating a light beam and applying a modulated magnetic field onto a magnetooptical recording medium.

2. Related Background Art

As a conventional method of recording information on an overwrite capable magnetooptical recording medium, an optical modulation overwrite method for performing an overwrite operation by changing laser beam power using an exchange-coupled multilayered film, or a magnetic field modulation recording method for recording information by applying an external magnetic field modulated according to recording information while irradiating a laser beam onto a magnetooptical recording medium, is known.

However, although the above-mentioned optical modulation overwrite method is advantageous in terms of high-speed recording since a light beam is modulated, jitter of a reproduction signal upon execution of pit edge recording is impaired due to a change in size of a pit to be recorded due to a high light beam intensity required for recording, a variation in recording sensitivity of a magnetooptical recording medium, or a change in environmental temperature, and it is difficult to increase the recording density.

In contrast to this, since the magnetic field modulation recording method suffers from less pit edge shift due to a change in intensity of a laser beam, it is suitable for a pit edge recording method for increasing the recording density. However, this method is disadvantageous in terms of high-speed recording since a strong magnetic field to be applied must be modulated at high speed in the recording mode while overcoming magnetic fields generated by the magnetooptical recording medium itself and the magnetooptical recording apparatus, as well. The magnetic field generated by the magnetooptical recording medium itself is a self leakage magnetic field applied from a surrounding portion which has not lost magnetization to a portion near the center of the light beam, which portion has lost magnetization when a recording light beam is irradiated from an optical pickup to a magnetooptical recording layer. The magnetic field generated by the magnetooptical recording apparatus includes a magnetic field generated by an actuator in the optical pickup, a magnetic field generated by a motor for performing a seek operation, a magnetic field generated by a clamp magnet for clamping a magnetooptical disk in the magnetooptical recording apparatus, leakage magnetic fields generated by motors arranged in the magnetooptical recording apparatus to perform various operations such as a loading operation of the magnetooptical recording medium, and the like.

SUMMARY OF THE INVENTION

The present invention has been made in consideration of the above-mentioned problems, and has as its object to provide a magnetooptical recording method and apparatus, which can greatly decrease the magnetic field intensity of a magnetic field required for recording, can greatly increase the recording frequency of the magnetic head even in a magnetic field modulation method, and can increase the recording density of information.

In order to achieve the above object, according to the present invention, there is provided a magnetooptical recording apparatus for recording information while irradiating a light beam onto a magnetooptical recording medium, comprising:

means for recording information on the medium by applying a magnetic field, which is modulated in accordance with an input signal, to the light beam irradiated portion; and means for applying a magnetic field for canceling a self leakage magnetic field applied from a portion having a magnetization other than the light beam irradiated portion of the medium, and a leakage magnetic field leaking from a member other than the medium.

According to the present invention, there is also provided a magnetooptical recording apparatus for recording information on a magnetooptical recording medium, comprising:

means for irradiating a light beam onto a predetermined portion of the medium; and means for recording information on the medium by applying a magnetic field, which is modulated in accordance with an input signal, onto the light beam irradiated portion, wherein when the light beam is irradiated, a self leakage magnetic field applied from a portion having a magnetization other than the light beam irradiated portion of the medium and a leakage magnetic field leaking from a member other than the medium cancel each other, and the light beam irradiated portion is set in a state with substantially no magnetization.

According to the present invention, there is also provided a magnetooptical recording apparatus for recording information on a magnetooptical recording medium, comprising:

means for irradiating a light beam onto a predetermined portion of the medium;

means for recording information on the medium by applying a magnetic field, which is modulated in accordance with an input signal, onto the light beam irradiated portion; and means for applying a magnetic field for canceling a self leakage magnetic field applied from a portion having a magnetization other than the light beam irradiated portion of the medium.

Other arrangements and methods of the present invention will become apparent from the following discussion.

DETAILED DESCRIPTION OF THE PREFERRED EMBODIMENTS

Figure 1:
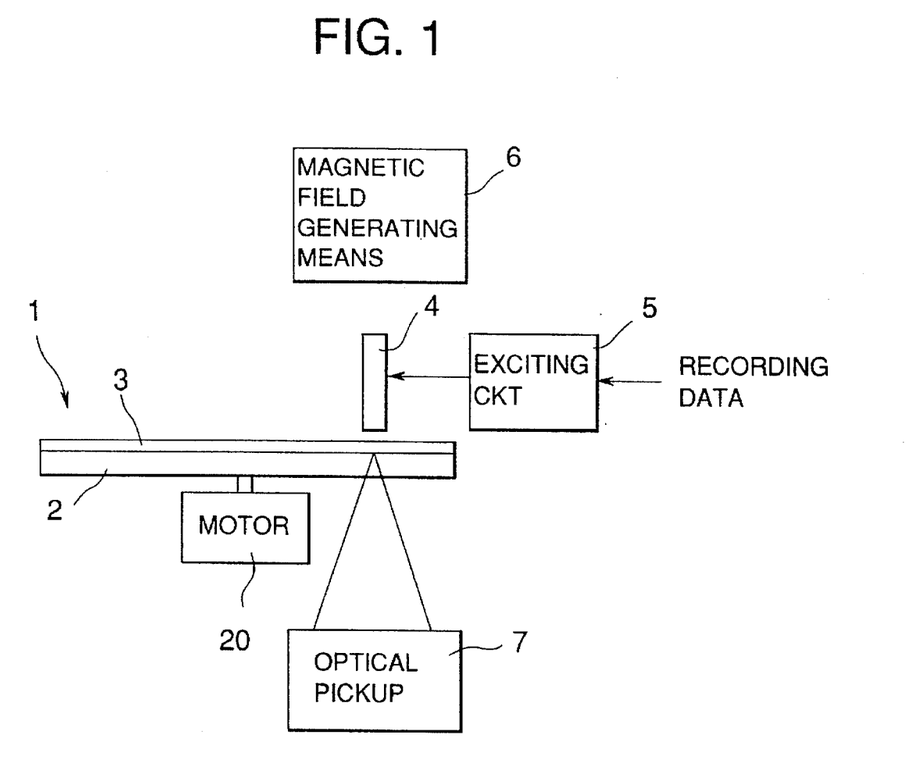
FIG. 1 is a block diagram showing an arrangement of a magnetooptical recording apparatus according to the first embodiment of the present invention.

The preferred embodiments of the present invention will be described in detail hereinafter with reference to the accompanying drawings. FIG. 1 is a block diagram showing an embodiment of a magnetooptical recording apparatus according to the present invention. Referring to FIG. 1, a magnetooptical disk 1 has a magnetooptical recording layer 3 formed on a transparent substrate 2, and is rotated by a motor 20. The rotational speed may be constant or different speeds may be set in correspondence with recording (reproduction) on an inner peripheral portion of the disk and recording (reproduction) on an outer peripheral portion of the disk. A magnetic head 4 is arranged above the upper surface of the magnetooptical disk 1. The magnetic head 4 generates a magnetic field, which is modulated in accordance with recording data upon driving of an exciting circuit 5, and applies the generated magnetic field to the magnetooptical disk 1 as a recording magnetic field. A magnetic field generating means 6 applies a magnetic field which has an intensity equal to and a direction opposite to those of a leakage magnetic field from the light beam irradiated portion, i.e., a magnetic field for canceling the leakage magnetic field from the light beam irradiated portion, to the magnetooptical recording layer 3. The magnetic field generating means 6 is arranged near the magnetic head 4, and comprises an electromagnet in this embodiment. An optical pickup 7 irradiates a recording/reproduction light beam, and detects a light beam reflected by the magnetooptical disk 1. The optical pickup 7 is arranged at a position opposite to the magnetic head 4 to sandwich the magnetooptical disk 1 therebetween. The optical pickup 7 comprises various optical elements such as a semiconductor laser as a light source, an objective lens for focusing a light beam to a small light spot, an optical sensor for detecting a light beam reflected by the magnetooptical disk 1, an actuator for driving an objective lens to perform focusing control and tracking control, and the like.

Figure 2:
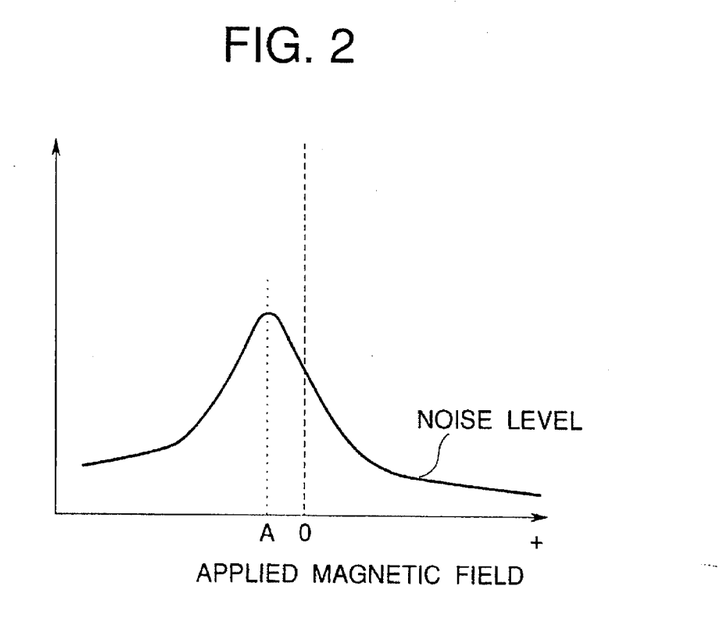
FIG. 2 is a graph for explaining a method of obtaining a magnetic field for canceling a leakage magnetic field.

A method of determining a magnetic field to be generated by the magnetic field generating means 6 will be described below with reference to FIGS. 2, 6, and 7. FIG. 2 is a view showing a noise level obtained when a recording light beam is irradiated from the optical pickup 7 while applying a magnetic field from the magnetic field generating means 6 without driving the magnetic head 4, and thereafter, reproduction is performed by the optical pickup 7. As can be seen from FIG. 2, the noise level has a maximal point with respect to the magnetic field applied from the magnetic field generating means 6, and a magnetic field A corresponding to the maximal noise level is determined as a magnetic field to be applied from the magnetic field generating means 6.

Figure 6:
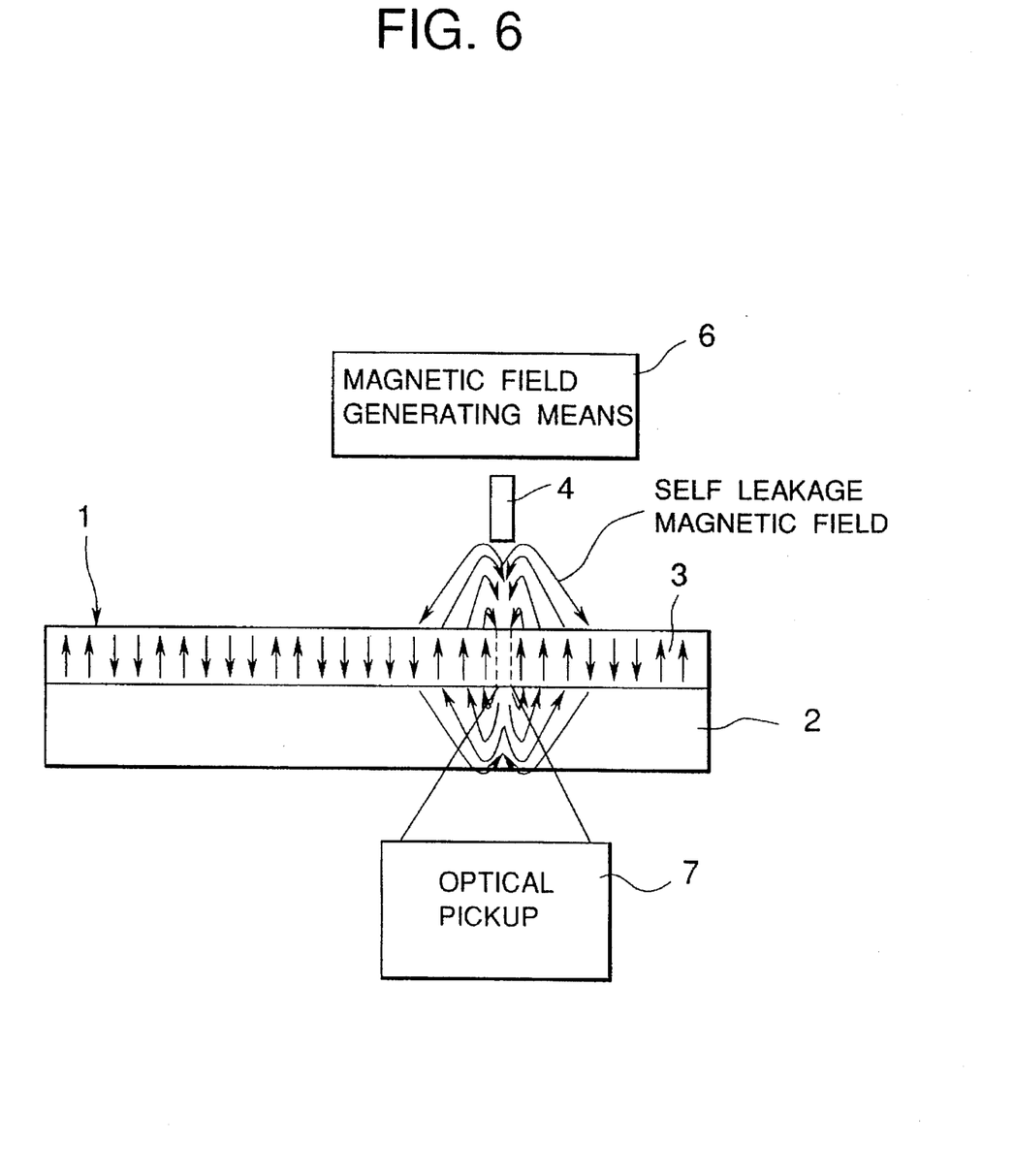
FIG. 6 is a view for explaining a self leakage magnetic field.
Figure 7:
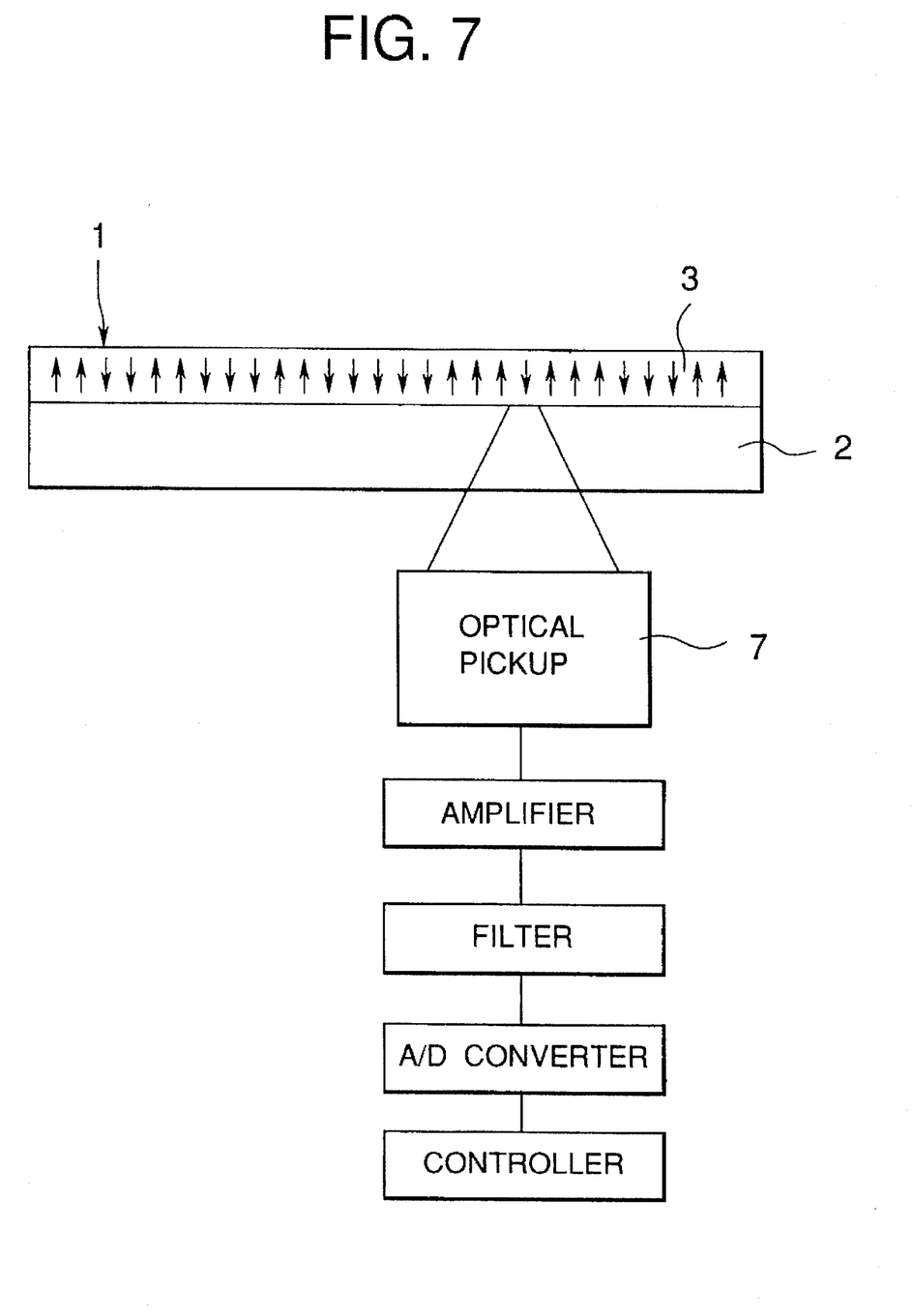
FIG. 7 is a view for explaining a method of obtaining an applied magnetic field A corresponding to a maximum noise level.

As shown in FIG. 6, when a recording light beam is irradiated from the optical pickup 7 to the magnetooptical recording layer 3, the magnetooptical recording layer 3 loses magnetization near the center of the light beam, but a self leakage magnetic field or the above-mentioned leakage magnetic field is applied from a surrounding portion which has not lost magnetization to the magnetization-free portion. Therefore, when no magnetic field is applied from the magnetic field generating means 6, the magnetization of the magnetooptical recording layer 3 near the center of the light beam is prone to be aligned in a given direction to follow a magnetic field as a sum of the self leakage magnetic field and other leakage magnetic fields. However, when the magnetic field generating means 6 applies a magnetic field which has an intensity equal to and a direction opposite to those of the leakage magnetic field, since the effective magnetic field applied to the portion irradiated with the recording light beam becomes zero, the magnetization of the magnetooptical recording layer 3 becomes most randomized, and the noise level is maximized. Therefore, as described above, the applied magnetic field A corresponding to the maximum noise level is used as the magnetic field which has an intensity equal to and a direction opposite to those of the leakage magnetic field applied to the light beam irradiated portion. As an example of a method of obtaining the applied magnetic field A corresponding to the maximum noise level, the following method may be adopted. That is, as described above, after a recording light beam is irradiated from the optical pickup 7 while applying a magnetic field, which is changed variously, from the magnetic field generating means 6 without driving the magnetic head 4, reproduction is performed by the optical pickup 7, as shown in FIG. 7. After the reproduction signal is processed via an amplifier and a filter, a noise voltage is read from the processed signal by an A/D converter, and the relationship between the read noise voltage value and the magnetic field applied from the magnetic field generating means 6 is processed by a controller, thereby obtaining the applied magnetic field A corresponding to the maximum noise level. Alternatively, after the recording light beam is irradiated in the same manner as described above, reproduction is performed by the optical pickup 7, the reproduction signal is observed using a spectrum analyzer, and a magnetic field corresponding to the maximum noise level can be obtained as the applied magnetic field A.

When information is recorded, the magnetic field determined as described above is generated by the magnetic field generating means 6, and the generated magnetic field is applied onto the magnetooptical disk 1 in addition to a recording magnetic field modulated according to an information signal of the magnetic head 4. Of course, a recording light beam having a predetermined intensity is irradiated from the optical pickup 7 onto the magnetooptical disk 1, and a series of information is recorded on an information track of the magnetooptical disk 1 by irradiation of the light beam and application of the modulated magnetic field.

In this embodiment, since the magnetic field for canceling a leakage magnetic field applied to the light beam irradiated portion is applied in addition to the modulated magnetic field, the recording magnetic field intensity of the magnetic head 4 can be reduced. More specifically, the magnetic field intensity of the magnetic head 4 is normally determined to include an extra magnetic field for canceling the above-mentioned leakage magnetic field applied to the light beam irradiated portion. However, according to the present invention, the magnetic field generating means 6, arranged separately from the magnetic head 4, cancels the leakage magnetic field applied to the light beam irradiated portion, and the magnetic head 4 does not require such a canceling magnetic field. Therefore, the magnetic field intensity of the magnetic head 4 can be reduced accordingly. Thus, the drive current of the magnetic head can be reduced, and power consumption of the magnetic head can be greatly saved. In general, the recording frequency of the magnetic head is limited by power consumption, and as the magnetic field intensity becomes larger, the recording frequency becomes lower. However, since the magnetic field intensity of the magnetic head can be reduced, as described above, power consumption of the magnetic head can be saved accordingly, thereby greatly increasing the recording frequency.

The present inventors conducted experiments for confirming quality of a reproduction signal obtained when information was recorded while canceling the leakage magnetic field applied to the light beam irradiated portion by the magnetic field generating means 6. The results of the experiments will be described below.

A magnetooptical recording apparatus shown in FIG. 1 was used, and a signal of 9.7 MHz was recorded at a radial position of 40 mm of the magnetooptical disk 1 having a diameter of 86 mm, which disk was rotated at 3,600 rpm, while applying the magnetic field, which was determined, as described above, and had an intensity equal to and a direction opposite to those of the leakage magnetic field, from the magnetic field generating means 6. The wavelength of a light beam was 780 nm, the recording light beam power was 8 mW, and the recording magnetic field generated by the recording head 4 was ±150 Oe. The applied magnetic field A by the magnetic field generating means 6, which has been described with reference to FIG. 2, was −100 Oe, and was applied in addition to a modulated magnetic field. When the recorded signal was reproduced, an NBSNR value of 50 dB was obtained, i.e., a good result was obtained.

In contrast to this, recording was performed under substantially the same conditions as those in the above experiment, except that no magnetic field was applied from the magnetic field generating means 6. When the recorded signal was reproduced, the NBSNR value was 43 dB, and was inferior to that obtained in the above experiment. Therefore, as can be apparent from the above-mentioned results of the experiments, it was confirmed that when information was recorded while canceling the leakage magnetic field applied to the light beam irradiated portion, quality of the reproduction signal could also be improved.

Figure 3:
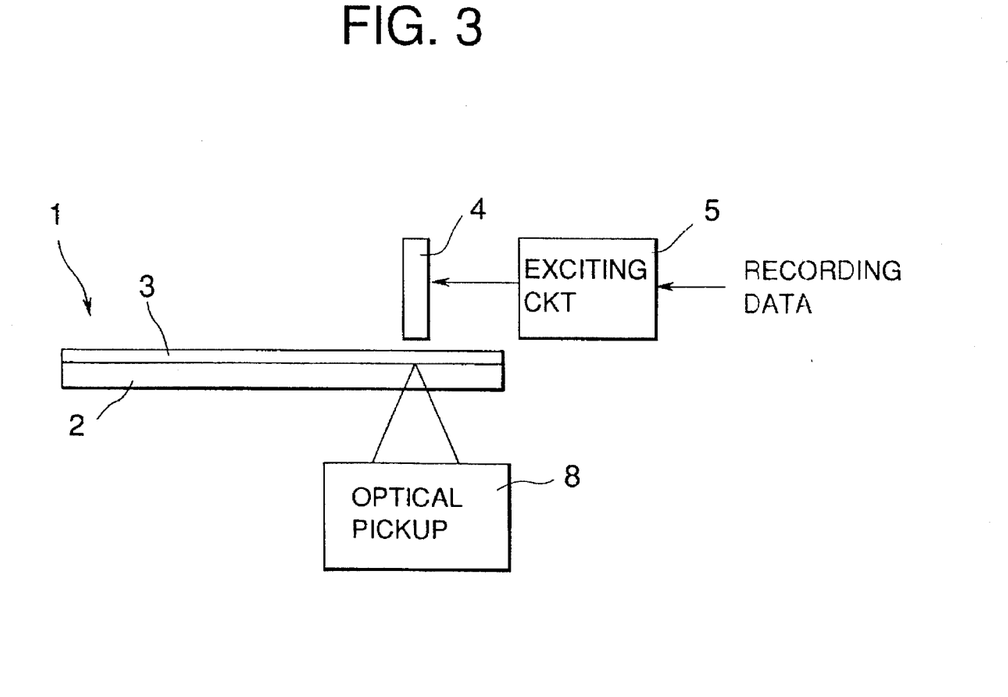
FIG. 3 is a block diagram showing the second embodiment of the present invention.

The second to fourth embodiments of the present invention will be described below with reference to FIGS. 3 to 5. FIG. 3 is a block diagram showing the second embodiment of the present invention. In this embodiment, in place of the independent magnetic field generating means 6, an optical pickup 8 which generates a leakage magnetic field of −100 Oe is utilized to cancel a leakage magnetic field applied to the light beam irradiated portion of the magnetooptical recording layer 3. In this embodiment as well, recording was performed using the recording/reproduction apparatus shown in FIG. 3 under the same conditions as those in the above experiments, and the recorded signal was reproduced. As a result, an NBSNR value of 50 dB was obtained.

Figure 4:
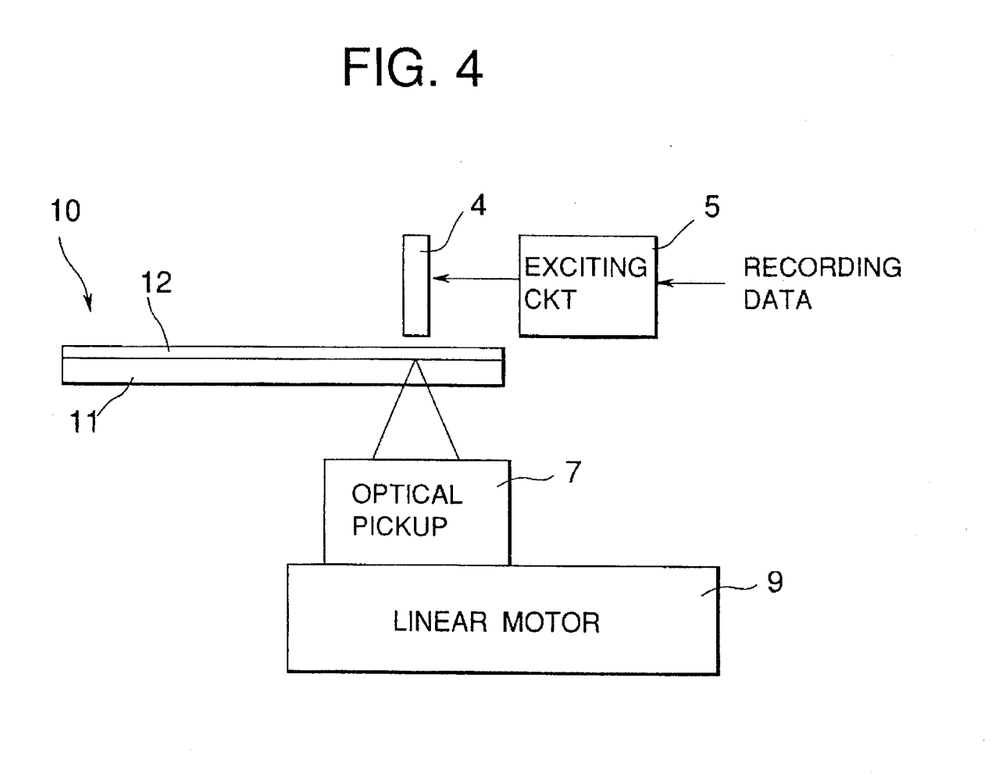
FIG. 4 is a block diagram showing the third embodiment of the present invention.

FIG. 4 is a block diagram showing the third embodiment of the present invention. In this embodiment, in place of the independent magnetic field generating means, a linear motor 9 which generates a leakage magnetic field of −60 Oe is utilized to cancel a leakage magnetic field applied to the light beam irradiated portion of a magnetooptical recording layer 12. A magnetooptical disk 10 shown in FIG. 4 has a leakage magnetic field of 60 Oe applied to the light beam irradiated portion in a recording mode. Recording was performed using the recording/reproduction apparatus shown in FIG. 4 under the same conditions as those in the above experiments, and the recorded signal was reproduced. As a result, an NBSNR value of 50 dB was obtained.

Figure 5:
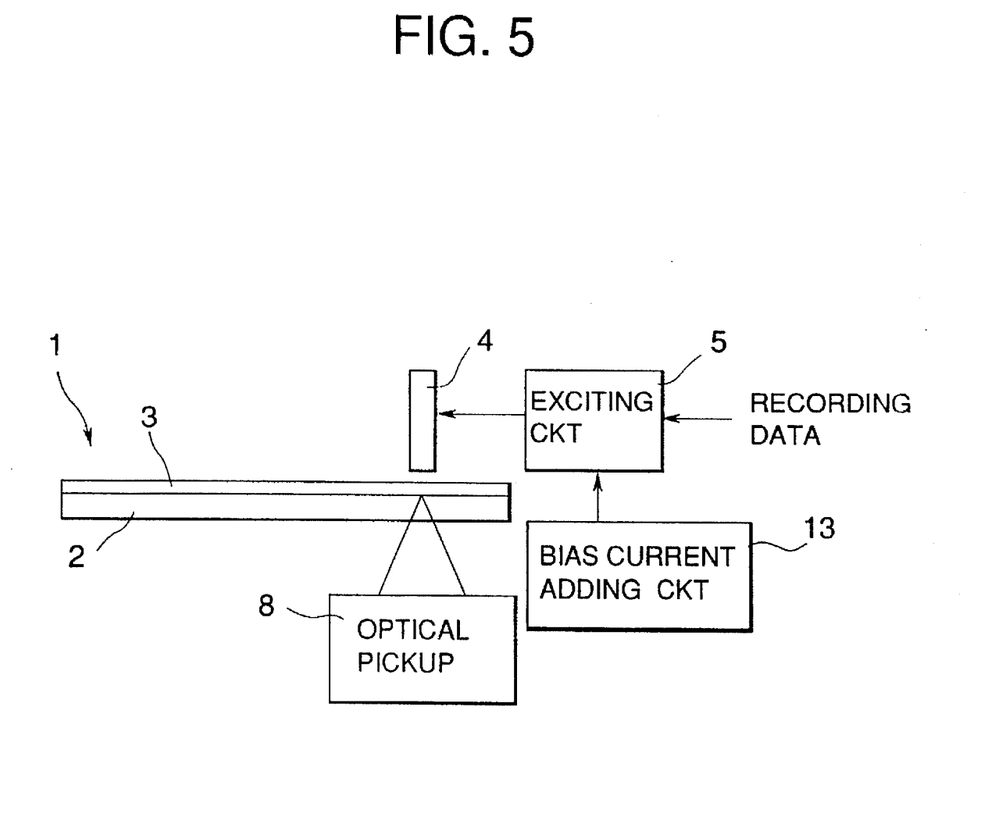
FIG. 5 is a block diagram showing the fourth embodiment of the present invention.

FIG. 5 is a block diagram showing the fourth embodiment of the present invention. In this embodiment, in place of the independent magnetic field generating means, a bias current adding circuit 13 superposes a DC bias current onto the magnetic head 4 to offset a magnetic field to be generated by the magnetic head 4, thereby canceling a leakage magnetic field applied to the recording light beam irradiated portion of the magnetooptical recording layer 3. More specifically, the magnetic field to be generated by the magnetic head 4 is shifted in a direction to cancel the leakage magnetic field applied to the light beam irradiated portion, thereby generating both a modulated magnetic field for recording, and a magnetic field for canceling the leakage magnetic field applied to the recording light beam irradiated portion. In this embodiment as well, recording was performed using the recording/reproduction apparatus shown in FIG. 5 under the same conditions as those in the above experiments, and the recorded signal was reproduced. As a result, an NBSNR value of 50 dB was obtained.

The fifth embodiment of the present invention will be described below. This embodiment uses the same magnetooptical recording apparatus as that in the first embodiment, and adopts another method of determining a magnetic field intensity to be generated by the magnetic field generating means 6 to cancel the leakage magnetic field. More specifically, the magnetic head 4 is driven to generate a magnetic field intensity lower than that for normal recording, and a signal is recorded while applying a magnetic field from the magnetic field generating means 6. The recorded signal is reproduced by the optical pickup 7, and an applied magnetic field corresponding to a maximum NBSNR value of the reproduction signal is determined as an applied magnetic field intensity for canceling the leakage magnetic field. The magnetic field intensity generated by the magnetic head 4 for normal recording is ±150 Oe. First, the magnetic head 4 was driven to generate a magnetic field intensity of ±75 Oe, and a signal was recorded while applying a magnetic field from the magnetic field generating means 6. When the recorded signal was reproduced by the optical pickup 7, and an applied magnetic field intensity corresponding to a maximum NBSNR value of the reproduction signal was calculated, we obtained a value of −100 Oe, which was the same value as the applied magnetic field intensity for canceling the leakage field in the first embodiment. Then, the recording magnetic field intensity generated by the magnetic head 4 was set to be ±150 Oe, the magnetic field intensity to be applied from the magnetic field generating means 6 was set to be −100 Oe, and recording was performed under the same conditions as in the above experiments while applying the magnetic field from the Magnetic Field generating means 6 in addition to a modulated magnetic field. When the recorded signal was reproduced, an NBSNR value of 50 dB was obtained. The above-mentioned method of determining the magnetic field intensity can be applied to all the embodiments shown in FIGS. 1, 3, 4, and 5, as a matter of course.

These determination methods of the magnetic field intensity are equivalent to measuring a magnetic field to be applied to the light beam irradiated portion of the magnetooptical recording medium. Therefore, according to these determination methods, in consideration of both the self leakage magnetic field and the above-mentioned leakage magnetic fields from members other than the magnetooptical recording medium, a magnetic field for canceling these leakage magnetic fields can be applied to the light beam irradiated portion.

If leakage magnetic fields from members other than the magnetooptical recording medium can be perfectly shielded, a magnetic field for canceling only the self leakage magnetic field need only be applied. In this case, the above-mentioned determination methods are also effective.

As described above, according to the present invention, since the magnetic field for canceling the leakage magnetic field applied to the light beam irradiated portion is applied in addition to a modulated magnetic field, the magnetic field intensity required for recording by the magnetic head can be greatly decreased. Therefore, the recording frequency of the magnetic head can be greatly increased, and the recording density of information can also be increased.

What is claimed is:

1. A method of recording information while irradiating a light beam onto a magnetooptical recording medium, comprising the steps of:

irradiating the light beam onto a predetermined portion of the magnetooptical recording medium to set the predetermined portion in a state without magnetization;

applying a magnetic field for canceling (i) a self leakage magnetic field of the medium leaking from a portion around the predetermined portion, and (ii) a leakage magnetic field leaking from a member other than the medium, onto the predetermined portion;

recording information by applying a magnetic field, which is modulated according to an input signal, onto the predetermined portion; and determining the magnetic field for canceling the leakage magnetic fields, said determining step comprising the steps of:
   (i) irradiating a recording light beam onto the predetermined portion;
   (ii) applying a second magnetic field different from the magnetic field to be applied in recording;
   (iii) reproducing a signal by irradiating a reproduction light beam onto the predetermined portion; and
   (iv) obtaining the second magnetic field corresponding to a maximum noise level in the reproduction.

2. A method of recording information while irradiating a light beam onto a magnetooptical recording medium, comprising the steps of:

irradiating the light beam onto a predetermined portion of the magnetooptical recording medium to set the predetermined portion in a state without magnetization;

applying a magnetic field for canceling (i) a self leakage magnetic field of the medium leaking from a portion around the predetermined portion, and (ii) a leakage magnetic field leaking from a member other than the medium, onto the predetermined portion;

recording information by applying a magnetic field, which is modulated according to an input signal, onto the predetermined portion; and determining the magnetic field for canceling the leakage magnetic fields, said determining step comprising the steps of:
   (i) irradiating a recording light beam onto the predetermined portion;
   (ii) performing recording by applying a magnetic field having an intensity lower than an intensity of the magnetic field to be applied in the recording;
   (iii) applying a second magnetic field different from the magnetic field to be applied in the recording;
   (iv) reproducing a signal by irradiating a reproduction light beam onto the predetermined portion; and
   (v) obtaining the second magnetic field corresponding to a maximum NBSNR value in the reproduction.

3. An information recording and/or reproducing apparatus for effecting at least one of recording of information on and reproducing of information from a recording medium, said apparatus comprising:

means for irradiating a light beam onto a predetermined portion of the recording medium;

means for recording information on the recording medium by applying a magnetic field modulated in accordance with an input signal to the light beam irradiated portion;

measuring means for measuring a magnitude of (i) a self leakage magnetic field of the recording medium applied from a portion of the medium having a magnetization other than the light beam irradiated portion to the light beam irradiated portion and (ii) a leakage magnetic field leaking from a member other than the recording medium to the light beam irradiated portion; and means for applying to the recording medium a magnetic field for canceling the self leakage magnetic field of the recording medium and the leakage magnetic field from the member other than the recording medium in accordance with the measurement made by said measuring means, wherein said measuring means comprises:
   (i) means for applying a second magnetic field having an intensity different from that upon recording information to the predetermined portion irradiated with the light beam;
   (ii) reproducing means for reproducing information by irradiating the predetermined portion of the recording medium with a reproducing light beam; and
   (iii) means for obtaining the magnitude of the second magnetic field corresponding to a maximum noise level during reproduction by said reproducing means and for determining that the obtained second magnetic field is the magnetic field for canceling the self leakage magnetic field and the leakage magnetic field.

4. An information recording and/or reproducing apparatus for effecting at least one of recording of information on and reproducing of information from a recording medium, said apparatus comprising:

means for irradiating a light beam onto a predetermined portion of the recording medium;

means for recording information on the recording medium by applying a magnetic field modulated in accordance with an input signal to the light beam irradiated portion;

measuring means for measuring a magnitude of (i) a self leakage magnetic field of the recording medium applied from a portion of the medium having a magnetization other than the light beam irradiated portion to the light beam irradiated portion and (ii) a leakage magnetic field leaking from a member other than the recording medium to the light beam irradiated portion; and means for applying to the recording medium a magnetic field for canceling the self leakage magnetic field of the recording medium and the leakage magnetic field from the member other than the recording medium in accordance with the measurement made by said measuring means, wherein said measuring means comprises:
   (i) means for recording information by applying a magnetic field having an intensity lower than a modulated magnetic field applied during recording of information while irradiating the predetermined portion with the light beam;
   (ii) means for applying a second magnetic field having an intensity different from that of the magnetic field applied during recording;
   (iii) reproducing means for reproducing information by irradiating the predetermined portion with a reproducing light beam; and (iv) means for obtaining the magnitude of the second magnetic field corresponding to a maximum NBSNR during the reproduction by said reproducing means and for determining that the obtained second magnetic field is the magnetic field for canceling the self leakage magnetic field and the leakage magnetic field.

* * * * *

UNITED STATES PATENT AND TRADEMARK OFFICE
CERTIFICATE OF CORRECTION

PATENT NO. : 5,636,187
DATED : June 3, 1997
INVENTOR(S) : EIICHI FUJII

It is certified that error appears in the above-identified patent and that said Letters Patent is hereby corrected as shown below:

<u>On the Cover Page, Under References Cited, U.S. PATENT DOCUMENTS</u>

"5,126,985" should read --5,126,983--.

<u>Column 6</u>

Line 45, "Magnetic" should read --magnetic--.
Line 46, "Field" should read --field--.

Signed and Sealed this

Thirtieth Day of December, 1997

*Attest:*

BRUCE LEHMAN

*Attesting Officer*  *Commissioner of Patents and Trademarks*